(12) United States Patent
Kwon

(10) Patent No.: US 6,810,252 B1
(45) Date of Patent: Oct. 26, 2004

(54) METHOD FOR DETECTING A HAND-OFF TARGET FREQUENCY IN A CELLULAR MOBILE TELECOMMUNICATION SYSTEM

(75) Inventor: Suk-Hyoung Kwon, Taejonkwangyok-shi (KR)

(73) Assignee: Samsung Electronics Co., LTD, Suwon-si (KR)

( * ) Notice: Subject to any disclaimer, the term of this patent is extended or adjusted under 35 U.S.C. 154(b) by 0 days.

(21) Appl. No.: 09/524,338

(22) Filed: Mar. 13, 2000

(30) Foreign Application Priority Data

Mar. 12, 1999 (KR) .......................................... 1999-8194

(51) Int. Cl.[7] .................................................. H04Q 7/20
(52) U.S. Cl. ...................................... 455/436; 455/439
(58) Field of Search ................................ 370/331, 332; 455/437, 442, 436, 439

(56) References Cited

U.S. PATENT DOCUMENTS 5,396,541 A * 3/1995 Farwell et al. .............. 455/403
6,111,864 A * 8/2000 Kabasawa ................... 370/332
6,151,502 A * 11/2000 Padovani et al. ........... 455/442

* cited by examiner

Primary Examiner—Nay Maung
Assistant Examiner—Tu Nguyen
(74) Attorney, Agent, or Firm—Cha & Reiter, LLC

(57) ABSTRACT

A method for detecting a hand-off target frequency of an MS in a CDMA communication system, comprising the steps of transmitting a pilot strength measurement message (PSMM) from the MS through at least one BTS to a BSC; causing the BSC to determine based on the PSMM whether the MS is located in a border of a BTS or whether the forward radio communication channel of the MS is in bad state; causing the BSC to command the MS to detect the hand-off target frequency when the MS is located in the border or when forward radio communication channel is in bad state; causing the MS to report the detection result of the BTS supporting the hand-off target frequency to the BSC; causing the BSC to perform the inter-frequency hand-off based on the detection report from the MS; causing the BSC to check whether the MS detecting the hand-off target frequency meets the requirement of stopping the detection of the hand-off target frequency; causing the BSC to command the MS to stop the detection when meeting the requirement; and, causing the MS to stop the detection.

18 Claims, 7 Drawing Sheets

METHOD FOR DETECTING A HAND-OFF TARGET FREQUENCY IN A CELLULAR MOBILE TELECOMMUNICATION SYSTEM

CLAIM OF PRIORITY

This application makes reference to, incorporates the same herein, and claims all benefits accruing under 35 U.S.C. Section 119 from an application for METHOD FOR DETECTING A HAND-OFF TARGET FREQUENCY IN A CELLULAR MOBILE TELECOMMUNICATION SYSTEM filed earlier in the Korean Industrial Property Office on Mar. 12, 1999 and there duly assigned Ser. No. 8194/1999.

BACKGROUND OF THE INVENTION

1. Field of the Invention

The present invention relates to a cellular mobile telecommunication system, and more particularly to a method for detecting a hand-off target frequency depending on the availability of radio resources at the base transceiver stations (BTSs) and the location of a mobile station (MS).

2. Description of the Related Art

In a code division multiple access (CDMA) communication system, the whole service area is divided into a plurality of base station coverage areas. Each divided area is defined as a cell and served by a base transceiver stations (BTS). All BTSs are systematically controlled by a mobile switching center (MSC), enabling a roaming MS to maintain the communication link between cells. For greater capacity, each cell is generally divided into several sectors. For example, each cell may be divided into three sectors, α, β, and γ, and each sector is provided with a sector antenna for serving the MS.

Referring to FIG. 1, the conventional CDMA communication system comprises a plurality of BTSs 120, 130 and 140 for communicating with the MS 110, a base station controller (BSC) 150 for controlling the BTSs, and a mobile switching center (MSC) 160 for connecting the BSC to another BTS or a public switched telephone network (PSTN). The CDMA system provides a hand-off scheme for maintaining the communication link between an MS and the BTSs when the MS travels from one cell to another.

The CDMA system employs a pseudo-random noise code (PN code) to divide a frequency into multiple code channels, thus serving considerably more subscribers compared to other communication systems such as the frequency division multiple access (FDMA). Basically, all the BTSs of the CDMA communication system employ the same set of frequency channels. However, the BTS located in a dense urban area requires more frequency channels to meet the high demand to serve more subscribers than in other areas. In this case, when an MS communicating with a BTS on a given frequency channel travels to another BTS not having the same frequency channel, the communication channel has be transferred from the current frequency channel of a cell to a different frequency channel of another cell. This is known as a hard hand-off or inter-frequency hand-off. Namely, the hard hand-off replaces the current communication channel with another channel in a different cell so that the MS can maintain the current communication link without interruption.

In the CDMA system, each BTS (or sector) is assigned with a specific pilot signal by which the MS distinguishes each BTS. The MS measures the strength of all the received pilot signals, which are transferred to a BSC through the currently connected BTS. The BSC analyzes the strength of the pilot signals to determine the hand-off and the type of hand-off. This process is called the mobile assisted hand-off (MAHO) because the hand-off is performed based on the signal strength measured by the MS. The IS-95B standard recommendation specifies that the MS would inform the BSC of the time to perform the inter-frequency hand-off as well as the environment of the hand-off target frequency (i.e., the strength of the pilot signal). Accordingly, the MS periodically or upon detecting the target frequency specified by the BSC, based on which the BSC determines whether the target BTS should perform the inter-frequency hand-off. However, when the target BTS has no reserved radio resource that can be assigned to the target frequency, the MS cannot help but lose the current communication connection. For this reason, the MS must often search for another target frequency to assist the hand-off which increases the load on the MS, causing communication link failure or power control failure.

SUMMARY OF THE INVENTION

It is an object of the present invention to provide a method for detecting a target frequency to provide an inter-frequency hand-off in a CDMA communication system, thus increasing the success rate of hand-off while minimizing the number of attempts searching for the alternate hand-off target frequency.

According to one embodiment of the present invention, a method for detecting a hand-off target frequency of an MS in a CDMA communication system, comprising the steps of transmitting a pilot strength measurement message (PSMM) from an MS to a BSC through at least one BTS; causing the BSC to determine based on the received PSMM whether the MS is located in the border region of a BTS or whether the forward radio communication channel of the MS is in bad state; causing the BSC to command the MS to detect a specific hand-off target frequency when the MS is located in the border region of the BTS or when the forward radio communication channel is in bad state; causing the MS to report all the BTSs providing the specified hand-off target frequency to the BSC; causing the BSC to perform the inter-frequency hand-off based on the reported target BTSs from the MS; causing the BSC to check whether the MS, while detecting the hand-off target frequency, meets the requirement of stopping the detection for the hand-off target frequency; causing the BSC to command the MS to stop the detection for the hand-off target frequency when meeting the requirement; and causing the MS to stop the detection.

According to another embodiment of the present invention, a method for detecting an inter-frequency hand-off target frequency by an MS in a CDMA communication system, comprising the steps of classifying the frequency channels of the BTSs as a "sufficient frequency resource state" if these frequency channels are available for a new call assignment or a hand-off; classifying the frequency channels of the BTSs as an "insufficient frequency resource state" if these frequency channels are substantially available and has a probability of failing the assignment of a channel during the periodic detection of a inter-frequency hand-off target frequency; classifying the frequency channels of the BTSs as a "consumed frequency resource state" if these frequency channels are unavailable; detecting common frequency commonly provided by the BTSs listed in the active set; selecting one of the detected common frequencies as the target frequency that renders all the BTSs to be in the "sufficient frequency resource state"; if there is no common frequency that renders all the BTSs to be in the "sufficient frequency resource state", excluding any common frequency corresponding to the "consumed frequency resource state"; selecting a common frequency from the remaining detected frequencies as the target frequency that renders relatively more BTSs to be in the "sufficient frequency resource state"; and, if no common frequency that renders relatively more BTSs to be in the "sufficient frequency resource state", selecting a common frequency from the remaining detected frequencies as the target frequency which renders relatively more BTSs to be in the "insufficient frequency resource state" as the target frequency.

According to still another embodiment of the present invention, the method for performing an inter-frequency hand-off of an MS by a BSC in a CDMA communication system, comprising the steps of classifying the frequency channels of the BTSs as a "sufficient frequency resource state" if these frequency channels are available for a new call assignment or a hand-off; classifying the frequency channels of the BTSs as an "insufficient frequency resource state" if these frequency channels are substantially available and has a probability of failing the assignment of a channel during the periodic detection of a inter-frequency hand-off target frequency; classifying the frequency channels of the BTSs as a "consumed frequency resource state" if these frequency channels are unavailable; detecting common frequency channels commonly provided by the BTSs listed in the active set; causing the MS to detect and report all target BTSs providing the target frequency, as specified by the BSC, as well as the strength of pilot signals from the target BTSs; causing the BSC to determine whether to perform the inter-frequency hand-off of the MS according to the report received from the MS; checking whether the target frequency of the target BTSs is in the "consumed frequency resource state" if the MS requires the inter-frequency hand-off; performing the inter-frequency hand-off to the target frequency if no target BTS has the target frequency in the "consumed frequency resource state"; checking whether the target BTS has the maximum pilot strength when it has the target frequency in the "consumed frequency resource state"; performing the inter-frequency hand-off of the MS to the remaining target BTSs while excluding the target BTS in the "consumed frequency resource state" if the target BTS does not have the maximum pilot strength; and, commanding the MS to detect a new target frequency selected when the BTS with the target frequency in the "consumed frequency resource state" has the maximum pilot strength.

According to a further embodiment of the present invention, a method for detecting an inter-frequency hand-off target frequency by an MS in a CDMA communication system, comprising the steps of classifying the frequency channels of the BTSs as a "sufficient frequency resource state" if these frequency channels are available for a new call assignment or a hand-off; classifying the frequency channels of the BTSs as an "insufficient frequency resource state" if these frequency channels are substantially available and has a probability of failing the assignment of a channel during the periodic detection of a inter-frequency hand-off target frequency; classifying the frequency channels of the BTSs as a "consumed frequency resource state" if these frequency channels are unavailable; detecting common frequency channels commonly provided by the BTSs listed in the active set; causing a BTS to report to the BSC that it has no frequency resource for a new assignment in the particular frequency channel assigned to itself; causing the BSC to set the BTS as a "consumed frequency resource state"; and causing the BSC to command the MS to detect another target frequency.

The present invention will now be described more specifically with reference to the drawings attached only by way of example.

BRIEF DESCRIPTION OF THE ATTACHED DRAWINGS

DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail as they would obscure the invention in unnecessary detail.

In accordance with the present invention, a base station controller BSC determines the time for detecting a hand-off target frequency based on the location of an MS and the state of the communication channel. Detecting the hand-off target frequency selected by the BSC, the MS reports to the BSC a list of base transceiver stations (BTSs) that provide the target frequency and the pilot signals from the BTSs received by the MS, so that the BSC may determine whether the MS requires the inter-frequency hand-off. Namely, if the inter-frequency hand-off is necessary, the BSC checks the frequency resources of the target BTSs to command the hand-off to the MS. If the frequency resources of the target BTSs are all consumed, the BSC commands the MS to detect a new target frequency. Moreover, when the location of the MS changes or the communication channel improves during the detection process for the hand-off target frequency, the BSC commands the MS to stop the detection of a hand-off target frequency.

Additionally, in accordance with the present invention, the BSC checks the state of the frequency resources of the BTSs connected thereto. When the frequency resource for each of the BTSs is all consumed or unavailable, the BSC receives a report that there is no available frequency resource for the hand-off. In this case, the BSC sets the state of the frequency resources of the corresponding BTS as the "consumed frequency resource state", commanding the MS to detect another target frequency.

Figure 1:
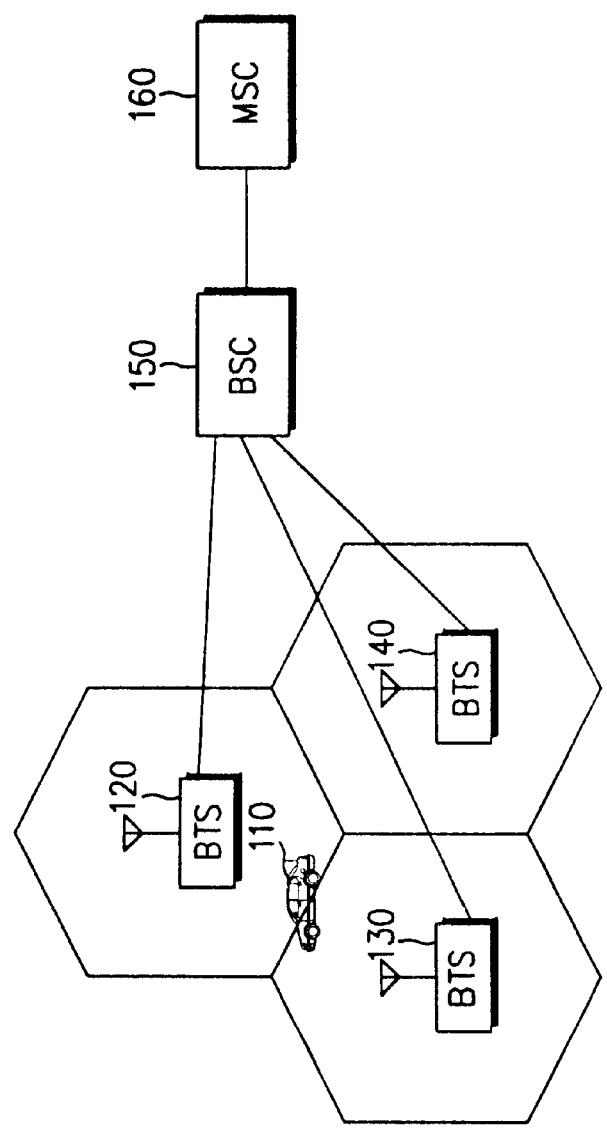
FIG. 1 is a block diagram for illustrating the network of a conventional CDMA communication system.
Figure 2:
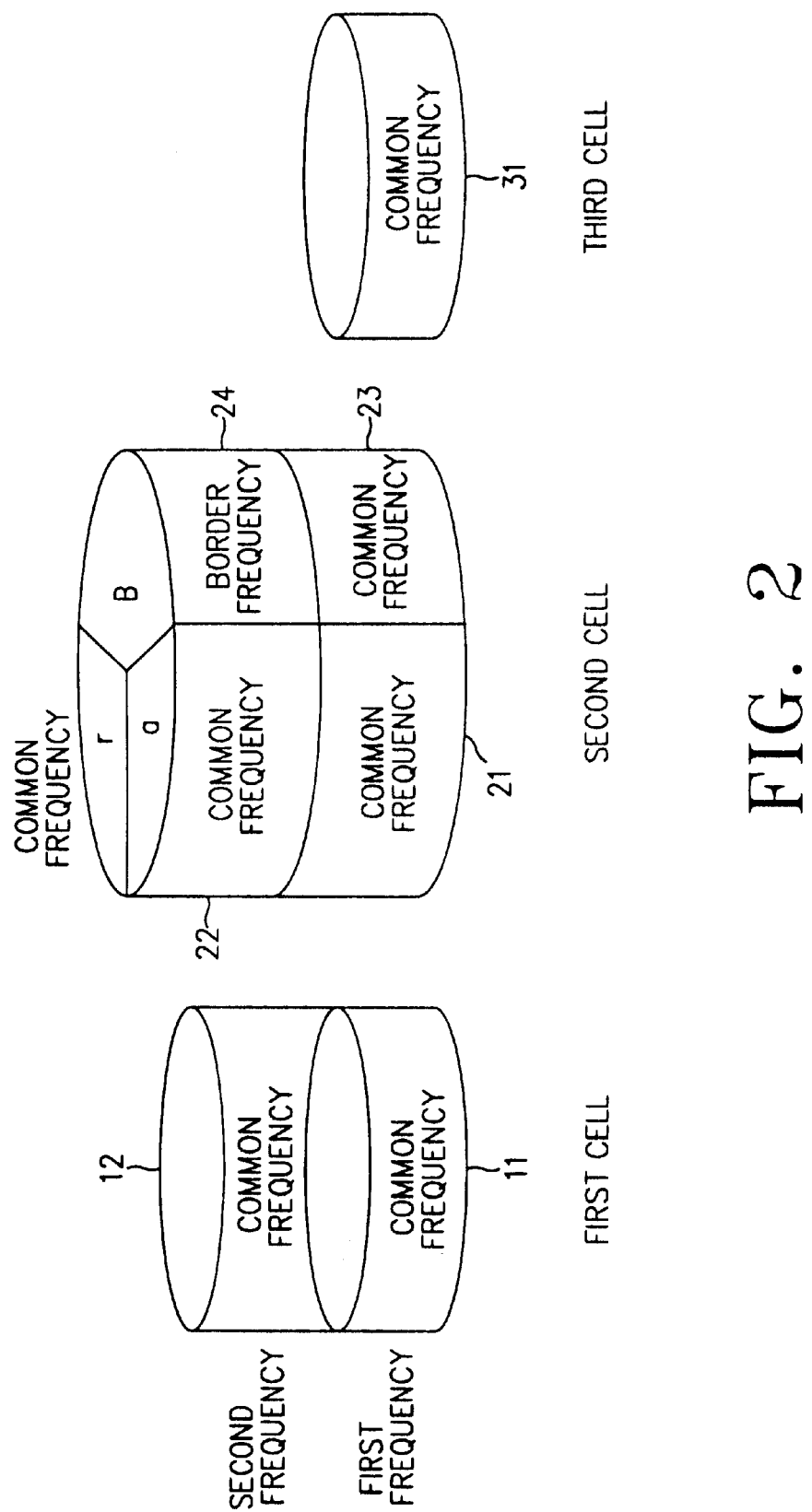
FIG. 2 is a schematic diagram for illustrating the sub-cells according to the present invention.

In order to determine whether the MS is located in an area requiring the inter-frequency hand-off according to the present invention, the BSC classifies the frequency channel of each area according to its service state in relation to its adjacent BTSs. The classification of frequency channel for each area is divided into two types: a common frequency channel and a boarder frequency channel. Referring to FIG. 2, in defining the frequency channel of each BTS as a sub-cell, the common frequency sub-cell is a sub-cell whose adjacent sub-cells are serving in the same frequency as the sub-cell, while the border frequency sub-cell is a sub-cell whose adjacent sub-cells cannot serve or is unavailable. For example, the first and the second frequency 11 and 12 of the first cell are set as the "common frequency sub-cell" in relation to the second cell because the same respective channels are served by the a sector of the second cell. However, the second frequency 24 of the β sector in the second cell operating in the second frequency is set as the "border frequency sub-cell" because the adjacent third cell provides only the first frequency. Thus, the BSC classifies the sub-cells of all the BTSs connected thereto into either the common frequency sub-cell or the border frequency sub-cell, and stores the sub-cell assignment information so that the sub-cell information is utilized to determine whether the current MS is located in the border frequency region requiring the inter-frequency hand-off.

Figure 3:
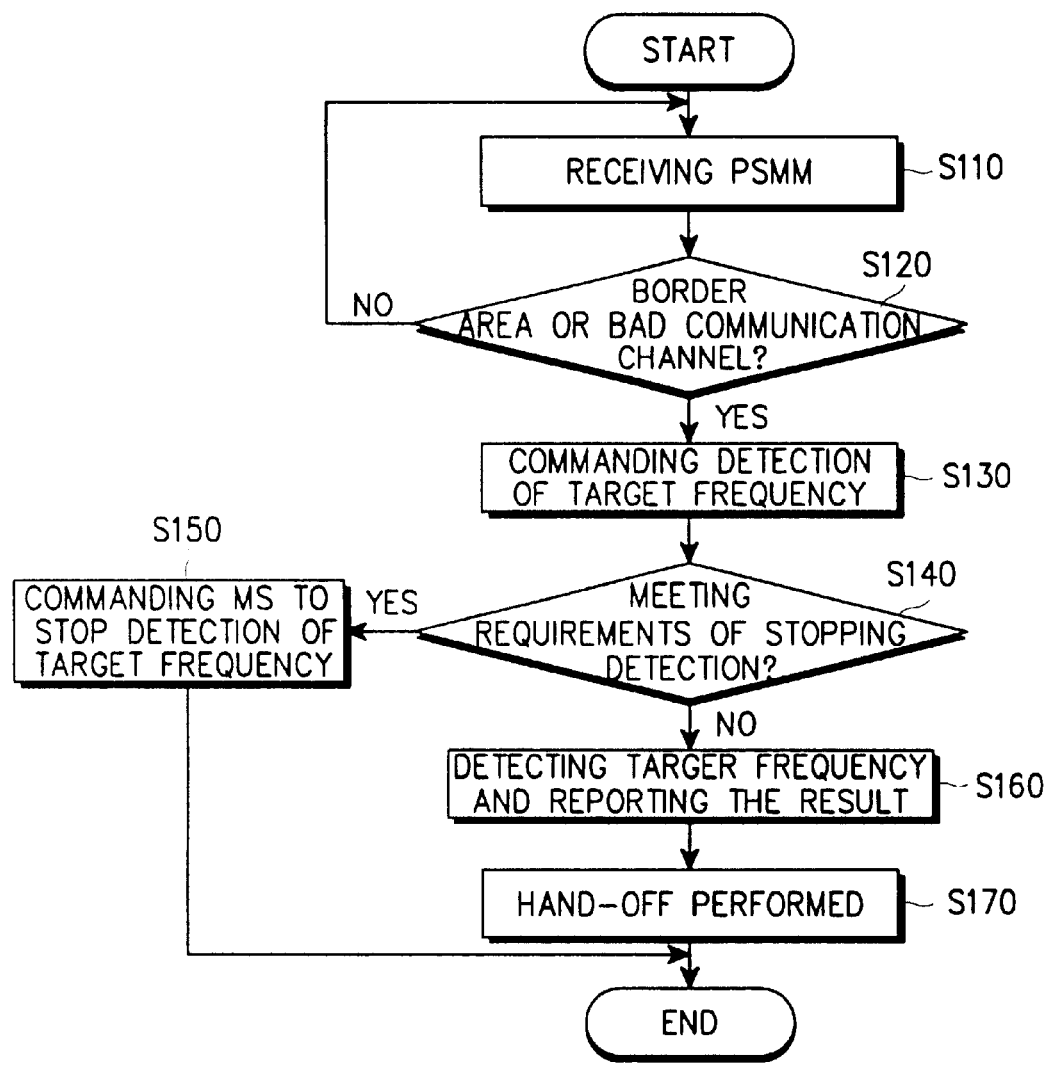
FIG. 3 is a flow chart for illustrating a method of detecting, the target frequency by an MS according to the embodiment of the present invention.

FIG. 3 illustrates a method for detecting the target frequency according to the present invention. As shown in FIG. 3, the BSC receives a pilot strength measurement message (PSMM) from the MS through at least one BTS in step S110. Based on the PSMM, the BSC determines whether the MS is located in the border frequency region of a BTS or whether the forward radio communication channel of the MS is in bad state to warrant the inter-frequency hand-off, in step S120. The BSC commands the MS to detect the hand-off target frequency if the MS is located in the border region or the forward radio communication channel is in bad state, in step S130. The BSC checks, in step S140, whether the MS detecting the hand-off target frequency meets the requirement of stopping the detection of the hand-off target frequency. If the requirement is met, the BSC commands the in step S150 to stop the detection of the hand-off target frequency. Otherwise, in step S160, the MS reports the detection of all the BTSs which provide the hand-off target frequency specified by the BSC. The BSC performs the inter-frequency hand-off based on the report received from the MS which contains the BTS providing the specified hand-off target frequency, in step S170.

Figure 4:
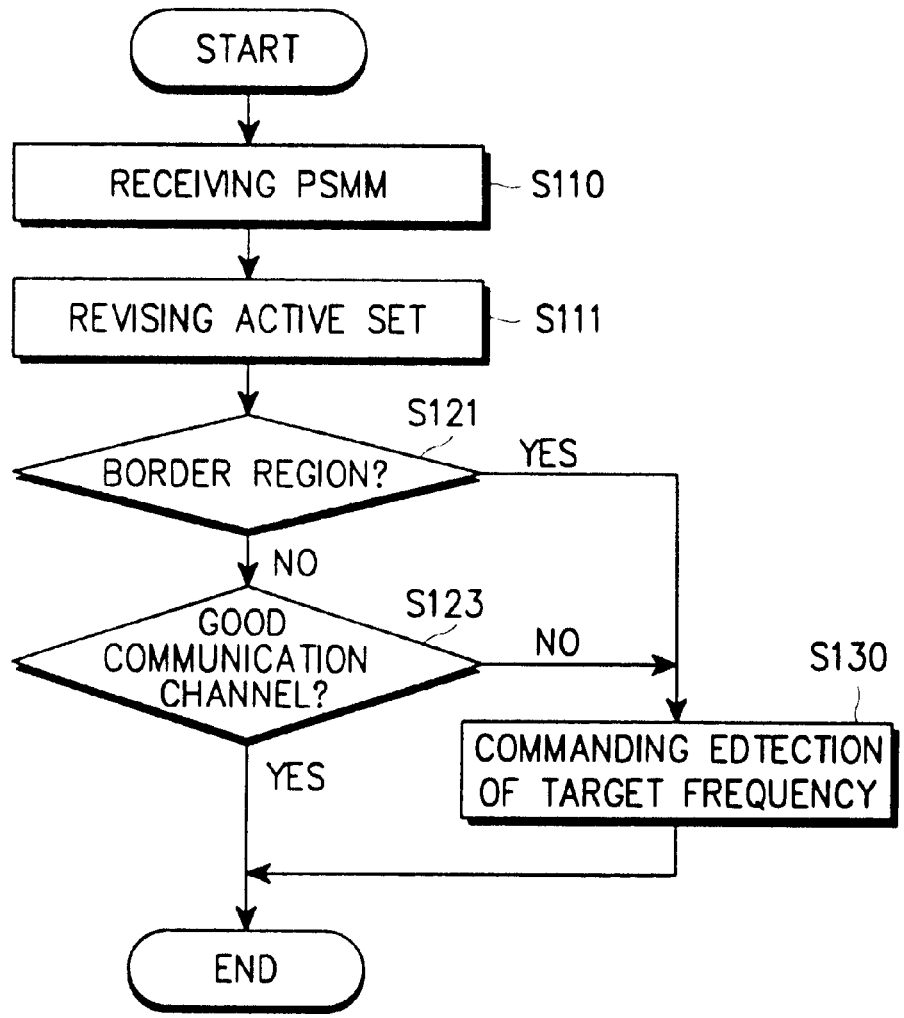
FIG. 4 is a flow chart for illustrating a method of commanding the detection of a target frequency according to the embodiment of the present invention.
Figure 5:
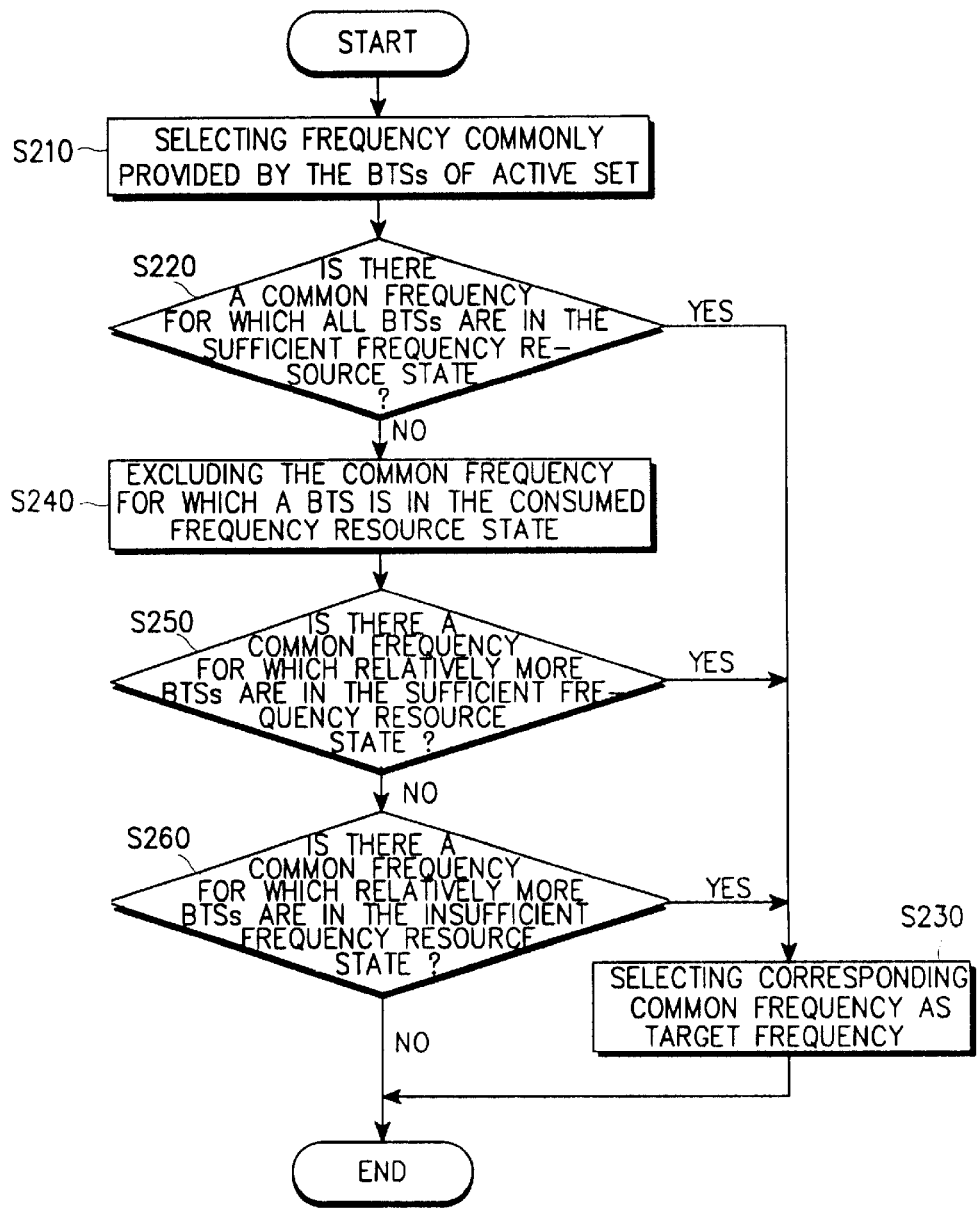
FIG. 5 is a flow chart for illustrating a method of selecting a target frequency according to the embodiment of the present invention.

Hereinafter, a description of the embodiment of the present invention is described with reference to FIGS. 4 to 7. Referring to FIG. 4, the MS communicating with at least one BTS loads a list of all the receivable pilot signals from the BTSs on the pilot strength measurement message (PSMM), which is transmitted to the BSC, in step S110. The MS transmits the PSSM periodically or upon detecting a different pilot signal that is not part of the BTSs with which it is currently in communication. The BSC stores the list of the BTSs communicating with the MS as an active set. When the list of the pilot signals contained in a PSMM is different from the active set, the BSC commands the MS to perform a general hand-off such as a soft hand-off, then revises the active set, in step S111.

When the active set is revised, the BSC determines whether the MS requires the inter-frequency hand-off, in step S121. To this end, the BSC firstly checks whether the MS is located in the border region. If a sub-cell has the maximum strength among the pilot signals contained in the active set of the MS and is classified as the "border frequency sub-cell", the BSC commands the MS to detect a specific hand-off target frequency, in step S130. Alternatively, if the current communication channel of the MS is degraded but not located in the border region, the BSC should also prepare for the inter-frequency hand-off. To this end, the BSC determines in step S123 whether the forward communication channel becomes poor. If it becomes poor, the BSC commands the MS to detect for a hand-off target frequency specified by the BSC.

In determining whether the communication channel becomes poor, the BSC determines the state of the communication channel based on the pilot signal strengths of the active set. If the pilot signal with the maximum strength in the active set does not exceed a prescribed reference value T_DOWN and the sum of the strength of all pilot signals contained in the active set does not exceed a prescribed reference value T_ACT_DOWN, the BSC determines the forward communication channel of the corresponding MS as poor, thus commanding the MS to detect the inter-frequency hard hand-off target frequency, in step S130. Normally, the BSC informs the MS of a selected target frequency. Then, the MS periodically detects the selected target frequency and waits for the new assignment of the communication channel. However, if no BTS has the frequency resource available to the selected target frequency, the MS is unable to execute the hand-off.

In order to prevent such hand-off failure according to the present invention, the BSC detects the availability of each frequency resources of the BTSs covering the location of the MS in order to select the optimum target frequency. The process of selecting the optimum target frequency is described in FIG. 5. The BSC selects the common frequencies provided commonly by all BTSs of the pilot signals contained in the active set in step S210, then searches and selects one of the frequencies to which all the BTSs are in the "sufficient frequency resource state" as the target frequency, in step S230. However, if no common frequency exists to which all the BTSs are in the "sufficient frequency resource state," the BSC first excludes the common frequencies to which all BTSs are in the "consumed frequency resource state", in step S240. Then, in step 250, among the remaining common frequencies, the BSC searches for the common frequency to which relatively more BTSs are in the "sufficient frequency resource state. Such common frequency is selected as the target frequency in step S230. However, if there is no such common frequency, the BSC searches in step S260 the common frequency for which relatively more BTSs are in the "insufficient frequency resource state." Then, such common frequency is selected as the target frequency in step S230. Alternatively, if there is no common frequency meeting the above requirement, the BSC returns to step S110 to wait for the next PSMM without commanding the detection of a target frequency.

Thus, the BSC selects as the target frequency the common frequency for which relatively more BTSs are in the sufficient or insufficient frequency resource state, by successively comparing and determining the BTS with the maximum pilot strength among the BTSs contained in the active set. The target frequency obtained in this way is reported to the MS. Then, while holding the current communication channel temporarily, the MS detects the target frequency specified by the BSC, then reports the detection result to the BSC, in step S160 of FIG. 3. Thereafter, the BSC performs the inter-frequency hand-off based on the detection result received from the MS, in step S170 of FIG. 3.

Figure 6:
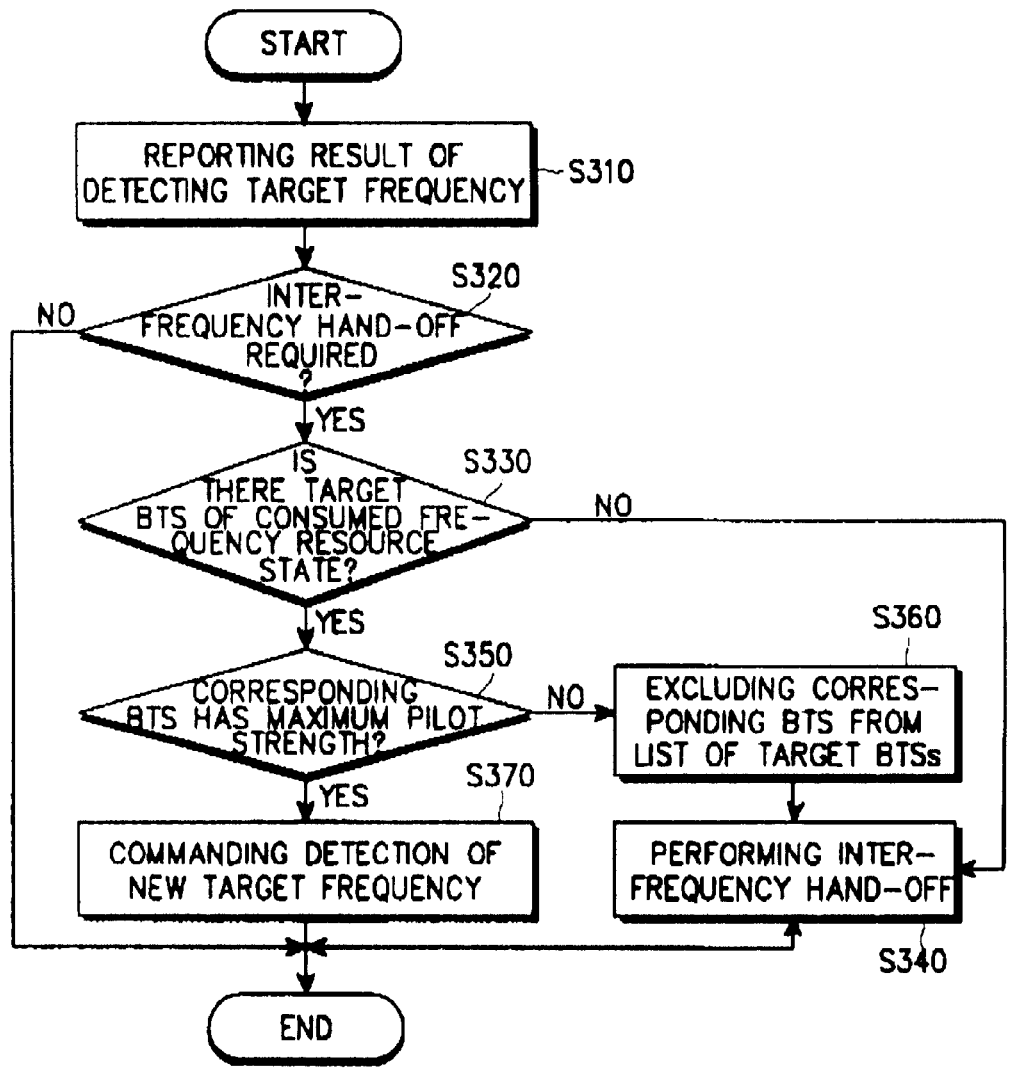
FIG. 6 is a flow chart for illustrating a method of performing the inter-frequency hand-off according to the embodiment of the present invention; and, FIG. 7 is a flow chart for illustrating a method of changing a target frequency according to the embodiment of the present invention.

The process of performing the inter-frequency hand-off is described with reference to FIG. 6. The MS detects the target frequency specified by the BSC and reports the list of target BTSs providing the specified target frequency and the channel environment of the target frequency to the BSC, in step S310. Then, the BSC checks the state of the channel currently used by the MS to determine whether the hand-off is required, in step S320. If the current channel is in poor state, the BSC commands the MS to perform the inter-frequency hand-off. Otherwise, the MS continues to use the current communication channel. If the inter-frequency handoff is required, the BSC searches the target BTSs providing the target frequency reported by the MS to detect a BTS that is in the "consumed frequency resource state" in step S330. If there is no such BTS, the BSC performs the inter-frequency hand-off for all the target BTSs in step S340.

In order to perform the inter-frequency hand-off, the BSC first commands the MS to perform the hand-off to the target frequency within the current communication cell. Then, the BSC commands the MS to perform the inter-cell soft hand-off to all the target BTSs. If a target BTS is in the "consumed frequency resource state" for the target frequency in step S330, then it is checked in step S350 whether the BTS has the maximum pilot strength among all target BTSs. If the target BTS of the consumed frequency resource state does not have the maximum pilot strength, the BSC excludes the target BTS from the target list in step S360 to perform the inter-frequency hand-off in the cell, including the soft hand-off, to the remaining target BTSs. Alternatively, if the BTS of the consumed frequency resource state has the maximum pilot strength among all target BTSs in step S350, the BSC commands the MS to detect a new target frequency selected by the BSC, in step S370.

As illustrate above, the BSC performs the inter-frequency hand-off of the MS that has performed the detection of the target frequency. However, if one of the BTSs providing the target frequency specified by the BTS changes to the "consumed frequency resource state" because of changes in the radio environment and/or changes in the location of the MS prior to completing the detection of the target frequency by the MS, the MS may select the incorrect BTS as the target BTS. In order to prevent this, the BSC checks the frequency resources of all the BTSs prior to completing the inter-frequency hand-off.

Figure 7:
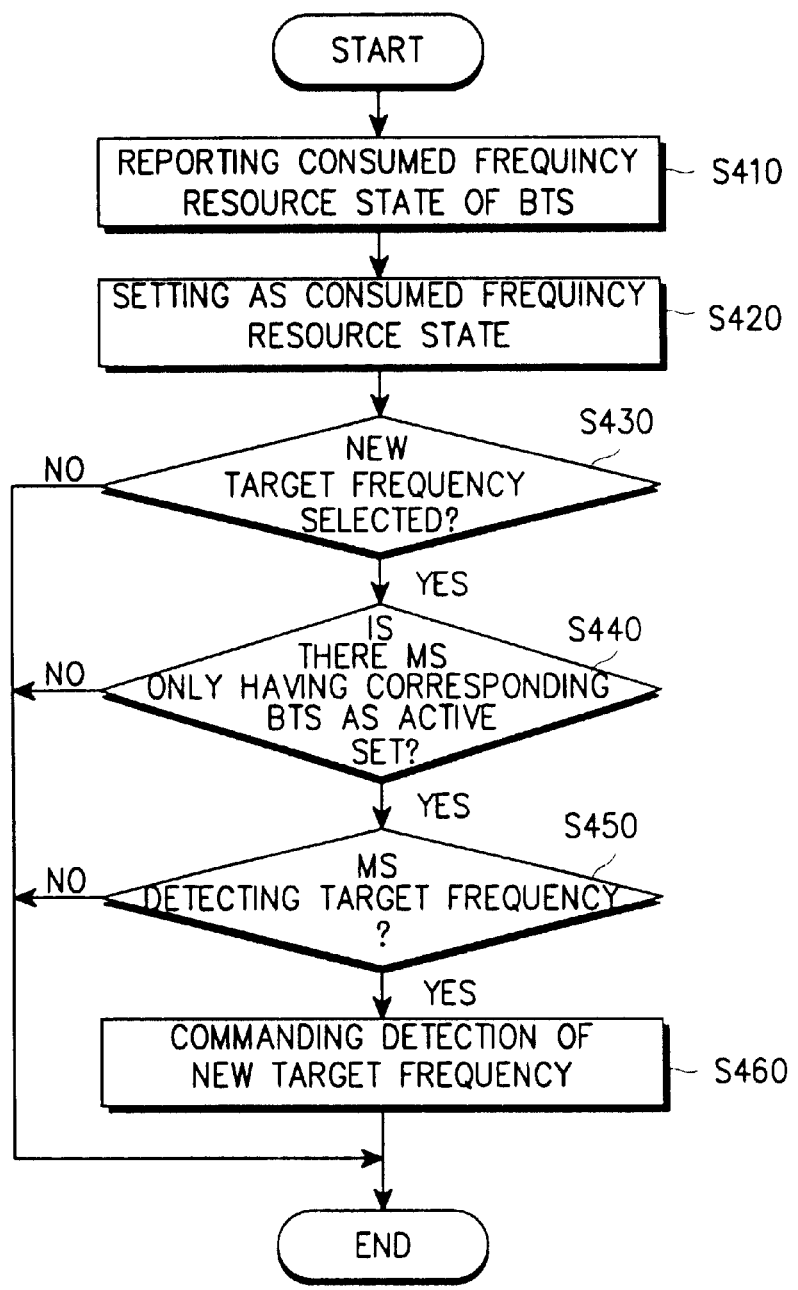

The process of changing the target frequency as explained in the above paragraph is described in connection with FIG. 7, if the frequency resource state is changed due to a newly assigned frequency resource or release of a previously assigned frequency resource, the BTS reports such a change in the frequency resource to the BSC. When the BTS reports to the BSC that there is no frequency resource for a particular target frequency due to a condition change, in step S410, the BSC sets the particular frequency of the BTS as the "consumed frequency resource state" in step S420. In addition, the BSC selects a new target frequency in step S430. Then, in step 440, the BSC searches its active set for an MS which only includes the particular BTS that was changed to "consumed state" in S410. If so, the BSC determines whether the MS found in S440 detects the "consumed frequency" that was changed in S420 as the target frequency, in step S450. If so, the BSC commands the MS to detect the new target frequency selected in S430, in step S460. Accordingly, the MS can always detect the target frequency that has not been changed to the "consumed frequency" just prior to completing the inter-frequency hand-off.

Alternatively, when the MS no longer requires the inter-frequency hand-off due to the changing radio environment or the changing location of the MS prior to completing the detection of the target frequency, the BSC commands the MS to stop the detection of the target frequency. Namely, when the BSC determines that the MS is located in an area that no longer requires the inter-frequency hand-off and the forward communication channel is in better state to conduct good communication, the BSC commands the MS to stop the detection process for the target frequency. Namely, when the sub-cell of the pilot signal with the maximum strength among the pilot signals contained in the active set of the MS is the common frequency sub-cell, the BSC determines that the MS is located in an area which no longer requires the inter-frequency hand-off. In addition, when the pilot signal with the maximum strength among the pilot signals contained in the active set exceeds a predetermined value, T_DOWN, or the sum of the pilot signal strengths contained in the active set exceeds a predetermined value, T_ACT_DOWN, the BSC determines that the communication channel is in good state. Hence, the MS is prevented from conducting the unnecessary detection of the target frequency.

According to the present invention, the correct time may be discovered to perform the inter-frequency hand-off, the probability of failing the inter-frequency hand-off is minimized by providing the optimal means of selecting a target frequency, performing the inter-frequency hand-off, and changing the target frequency based on the frequency resource state of the BTS. Moreover, the unnecessary detection by the MS of the target frequency is eliminated by providing the interruption of such detection.

While the present invention has been described in connection with specific embodiments accompanied by the attached drawings, it will be readily appreciated that various changes and modifications may be made thereto without departing from the gist of the present invention.

What is claimed is:

1. A method for detecting a hand-off target frequency of a mobile station (MS) in a CDMA communication system, comprising the steps of:

(a) transmitting a pilot strength measurement message (PSMM) from said MS, through at least one base transceiver station (BTS), to a base station controller (BSC), said BSC having an active set containing a list of BTSs communicating with said MS;

(b) causing said BSC to determine based on said PSMM whether said MS is located in a border of said BTS when the active set is revised or whether a forward radio communication channel of said MS is in bad state;

(c) causing said BSC to command said MS to detect said hand-off target frequency when said MS is located in said border of said BTS or when said forward radio communication channel is in bad state;

(d) causing said MS to report a list of target BTSs that provides said hand-off target frequency to said BSC and causing said BSC to command said MS to stop said detection when location of said MS changes or the forward communication channel improves while detecting said hand-off target frequency from said BTS;

(e) causing said BSC to perform an inter-frequency hand-off if frequency resources of the target BFSs reported by said MS are available, otherwise causing said MS to perform the inter-frequency handoff to all target BTSs; and (f) causing said MS to stop said detection.

2. A method for causing a base station controller (BSC) to command a mobile station to detect an inter-frequency hand-off target frequency in a CDMA communication system, comprising:

(a) transmitting a pilot strength measurement message (PSMM) from said MS, through at least one BTS, to said BSC;

(b) upon receiving said PSMM from said MS, causing said BSC to revise an active set containing a plurality of pilot signals from said BTSs currently communicating with said MS;

(c) causing said BSC to analyze the revised active set to determine whether said MS is located in an area requiring an inter-frequency hand-off;

(d) commanding said MS to detect said inter-frequency hand-off target frequency if said MS is located in the area requiring said inter-frequency hand-off;

(e) checking the state of a forward communication channel of said MS if said MS is not located in the area requiring said inter-frequency hand-off; and, (f) commanding said MS to detect said inter-frequency hand-off target frequency if said forward communication channel is in bad state, wherein said step(e) of checking the state of said forward communication channel comprises the step of: defining a reference pilot signal strength as T_DOWN and a sum of the strength of said pilot signals of said active set as T_ACT_DOWN, and determining said forward communication channel as said bad state if said pilot signal with the maximum strength from said active set is less than said T_DOWN and the sum of the strength of said pilot signals of said active set is less than said T_ACT_DOWN.

3. The method as defined in claim 2, wherein said step of commanding said MS to detect said inter-frequency hand-off target frequency comprises the steps of:

(1) classifying a frequency channel of a BTSs as "sufficient frequency resource state" if said frequency channel is available for said inter-frequency hand-off;

(2) classifying a frequency channel of said BTSs as "insufficient frequency resource state" if said frequency channel is substantially available;

(3) classifying a frequency channel of said BTSs as "consumed frequency resource state" if said frequency channel is unavailable for said inter-frequency hand-off;

(4) detecting a plurality of common frequencies provided by said BTSs through said pilot signals of said active set;

(5) selecting a first common frequency from said detected common frequencies as said target frequency, said first common frequency rendering said BTSs in said active set to be in said sufficient frequency resource state;

(6) if there is no said first common frequency rendering said BTSs to be in said sufficient frequency resource state, excluding said common frequency corresponding to said consumed frequency resource state from said detected common frequencies;

(7) selecting a second common frequency from the remaining said detected common frequencies as said target frequency, said second common frequency rendering relatively more BTSs to be in said "sufficient frequency resource state";

(8) if no said second common frequency rendering relatively more BTSs to be in said sufficient frequency resource state, selecting a third common frequency from the remaining said detected frequencies as said target frequency, said third common frequency rendering relatively more BTSs to be in said insufficient frequency resource state; and, (9) transmitting said selected target frequency from said step to said MS.

4. The method as defined in claim 2, said method further comprising the step of commanding said MS to stop the detection of said target frequency if said forward communication channel changes from said bad state to good state.

5. The method as defined in claim 4, wherein said BSC defines each frequency channel of said plurality of BTSs as a plurality of sub-cells, wherein said BSC assigns said sub-cell in a cell as a common frequency sub-cell if an adjacent sub-cell in another cell at same frequency is available, and wherein said BSC assigns said sub-cell as a border frequency sub-cell if one of said adjacent sub-cells of said particular sub-cell is not available.

6. The method as defined in claim 5, wherein said step of determining whether said MS is located in the area requiring said inter-frequency hand-off comprises the further steps of:

determining whether said sub-cell with a maximum strength of said pilot signal from said active set corresponds to said border frequency sub-cell; and, determining said MS is located in the area requiring said inter-frequency hand-off if said-sub cell with the maximum strength corresponds to said border frequency sub-cell.

7. The method as defined in claim 6, further comprising the step of determining said MS is not located in the area requiring said inter-frequency hand-off if said sub-cell with the maximum strength corresponds to said common frequency sub-cell.

8. The method as defined in claim 7, wherein said step of checking the state of said forward communication channel comprises the step of:

defining a reference pilot signal strength as T_DOWN and a sum of the strength of said pilot signals of said active set as T_ACT_DOWN; and, determining said forward communication channel as said bad if said pilot signal with the maximum strength from said active set is less than said T_DOWN and the sum of the strength of said pilot signals of said active set is less than said T_ACT_DOWN.

9. The method as defined in claim 8, wherein said forward communication channel is determined as said good state if said pilot signal with the maximum strength among said active set is greater than said T_DOWN and the sum of the strength of said pilot signals of said active set is higher than said T_ACT_DOWN.

10. The method as defined in claim 9, wherein the step of commanding said MS to detect the inter-frequency hand-off target frequency comprises the steps of:

(1) classifying a frequency channel of said BTSs as "sufficient frequency resource state" if said frequency channel is available for said inter-frequency hand-off;

(2) classifying a frequency channel of said BTSs as "insufficient frequency resource state" if said frequency channel is substantially available;

(3) classifying a frequency channel of said BTSs as "consumed frequency resource state" if said frequency channel is unavailable for said inter-frequency hand-off;

(4) detecting a plurality of common frequencies provided by said BTSs through said pilot signals of said active set;

(5) selecting a first common frequency from said detected common frequencies as said target frequency, said first common frequency rendering said BTSs in said active set to be in said sufficient frequency resource state;

(6) if there is no said first common frequency rendering said BTSs to be in said sufficient frequency resource state, excluding said common frequency corresponding to said consumed frequency resource state from said detected common frequencies;

(7) selecting a second common frequency from the remaining said detected common frequencies as said target frequency, said second common frequency rendering relatively more BTSs to be in said "sufficient frequency resource state";

(8) if there is no said second common frequency rendering relatively more BTSs to be in said sufficient frequency resource state, selecting a third common frequency from the remaining said detected frequencies as said target frequency, said third common frequency rendering relatively more BTSs to be in said insufficient frequency resource state; and, (9) transmitting said selected target frequency from said step to said MS.

11. A method for detecting an inter-frequency hand-off target frequency by an MS in a CDMA communication system, comprising the steps of:

(1) classifying a frequency channel of a BTS as "sufficient frequency resource state" if said frequency channel is available for said inter-frequency hand-off;

(2) classifying a frequency channel of said BTS as "insufficient frequency resource state" if said frequency channel is substantially available;

(3) classifying a frequency channel of said BTS as "consumed frequency resource state" if said frequency channel is unavailable for said inter-frequency hand-off;

(4) detecting a plurality of common frequencies provided by a plurality of BTSs through said pilot signals of said active set;

(5) selecting a first common frequency from said detected common frequencies as said target frequency, said first common frequency rendering said BTSs in said active set to be in said sufficient frequency resource state;

(6) if there is no said first common frequency rendering said BTSs to be in said sufficient frequency resource state, excluding said common frequency corresponding to said consumed frequency resource state from said detected common frequencies;

(7) selecting a second common frequency from the remaining said detected common frequencies as said target frequency, said second common frequency rendering relatively more BTSs to be in said "sufficient frequency resource state"; and, (8) if there is no said second common frequency rendering relatively more BTSs to be in said sufficient frequency resource state, selecting a third common frequency from the remaining said detected frequencies as said target frequency, said third common frequency rendering relatively more BTSs to be in said insufficient frequency resource state.

12. A method for performing an inter-frequency hand-off of a mobile station by a BSC in a CDMA communication system, comprising the steps of:

(1) classifying a frequency channel of a BTS as "sufficient frequency resource state" if said frequency channel is available for said inter-frequency hand-off;

(2) classifying a frequency channel of said BTS as "insufficient frequency resource state" if said frequency channel is substantially available;

(3) classifying a frequency channel of said BTS as "consumed frequency resource state" if said frequency channel is unavailable for said inter-frequency hand-off;

(4) causing said MS to detect said target frequency and report to said BSC with a list of target BTSs providing said target frequency and a corresponding pilot signal strength of said target BTSs received by said MS;

(5) causing said BSC to determine whether to perform said inter-frequency hand-off in response to a determination based on said report received from said MS;

(6) checking whether said target frequency of said target BTSs is in said consumed frequency resource state if said MS requires said inter-frequency hand-off;

(7) performing said inter-frequency hand-off at said target frequency if said target frequency of said target BTSs does not correspond to said consumed frequency resource state;

(8) checking whether one of said target BTSs provides the maximum pilot strength if said target frequency of said one target BTS is in said consumed frequency resource state;

(9) if said one target BTS does not have the maximum pilot strength, performing said inter-frequency hand-off to the remaining said target BTSs while excluding said one target BTS in said consumed frequency resource state; and,

(10) if said one target BTS does have the maximum pilot strength, commanding said MS to select a new target frequency.

13. The method as defined in claim 12, wherein said inter-frequency hand-off is required when a current communication channel between said BTS and said MS is in bad state.

14. The method as defined in claim 13, wherein said step of performing said hand-off comprises the steps of:

commanding said target BTSs to assign frequency resource; and, commanding said MS to perform said inter-frequency hand-off to said target BTSs if the assignment of said frequency resource is successful.

15. The method as defined in claim 14, wherein said step of performing said hand-off further comprising the steps of:

checking whether a target BTS has the maximum pilot strength among all the target BTSs;

performing said inter-frequency hand-off to the remaining target BTSs with excluding the target BTS if it does not have the maximum pilot strength;

selecting a new target frequency if the target BTS failing in said assignment of the frequency resources has the maximum pilot strength; and, commanding said MS to detect said new target frequency.

16. The method as defined in claim 15, wherein said step of performing said hand-off further comprising the step of waiting for a new PSMM from said MS if the selection of said new target frequency is unsuccessful.

17. A method for detecting an inter-frequency hand-off target frequency in a CDMA communication system, comprising the steps of:

(1) classifying a frequency channel of a BTS as "sufficient frequency resource state" if said frequency channel is available for said inter-frequency hand-off;

(2) classifying a frequency channel of said BTS as "insufficient frequency resource state" if said frequency channel is substantially available;

(3) classifying a frequency channel of said BTS as "consumed frequency resource state" if said frequency channel is unavailable for said inter-frequency hand-off;

(4) causing said BTS to report to said BSC that it has no frequency resource available for a new assignment at a specific frequency channel thereon;

(5) causing said BSC to set said specific frequency channel of said BTS as a consumed frequency resource state; and, (6) causing said BSC to command a MS to detect another target frequency.

18. A method as defined in claim 17, wherein said step(6) of commanding said MS to detect said another target frequency comprises the steps of:

selecting said another target frequency of said BTS;

determining whether said specific frequency channel is only supported by said BTS;

commanding said MS to detect said another target frequency if there is no other frequency channel supported by said BTS.

* * * * *